United States Patent
Shiraki et al.

(10) Patent No.: US 9,266,240 B2
(45) Date of Patent: Feb. 23, 2016

(54) ROBOT

(71) Applicant: KABUSHIKI KAISHA YASKAWA DENKI, Kitakyushu-shi (JP)

(72) Inventors: Tomoyuki Shiraki, Fukuoka (JP); Atsushi Ichibangase, Fukuoka (JP); Yuji Sajikawa, Fukuoka (JP); Tomohiro Matsuo, Fukuoka (JP); Shinichi Ishikawa, Fukuoka (JP); Tomoki Kawano, Fukuoka (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 0 days.

(21) Appl. No.: 14/549,453

(22) Filed: Nov. 20, 2014

(65) Prior Publication Data
US 2015/0081095 A1    Mar. 19, 2015

Related U.S. Application Data

(63) Continuation of application No. PCT/JP2012/062948, filed on May 21, 2012.

(51) Int. Cl.
*G05B 19/04*      (2006.01)
*B25J 9/16*       (2006.01)
(Continued)

(52) U.S. Cl.
CPC .............. *B25J 9/1676* (2013.01); *B25J 9/047* (2013.01); *B25J 9/1674* (2013.01); *B25J 13/088* (2013.01);
(Continued)

(58) Field of Classification Search
CPC ...... B25J 13/088; B25J 9/1651; B25J 9/1676; B25J 9/1694; B25J 9/1638; B25J 9/10; B25J 9/1633; B25J 9/1674; B25J 9/1656; B25J 9/1664; B25J 9/06; B25J 9/1605; B25J 9/163; B25J 9/1658; B25J 17/00; B25J 19/02; B25J 9/047; Y10S 901/29; Y10S 901/30; Y10S 901/49; Y10S 901/02; G05B 9/02
USPC .......... 701/245, 253, 258, 261; 901/2, 27, 29, 901/30, 49
See application file for complete search history.

(56) References Cited

U.S. PATENT DOCUMENTS 5,513,946 A * 5/1996 Sawada .................... B25J 9/042
                                            414/744.5
6,343,242 B1 * 1/2002 Nomura ................ B25J 9/1676
                                            318/568.11

(Continued)

FOREIGN PATENT DOCUMENTS

CN    102233588 A    11/2011
CN    102328312 A     1/2012

(Continued)

OTHER PUBLICATIONS

Translation of Written Opinion for corresponding International Application No. PCT/JP2012/062948, Jun. 12, 2012.
(Continued)

*Primary Examiner* — Khoi Tran
*Assistant Examiner* — Jorge Peche
(74) *Attorney, Agent, or Firm* — Mori & Ward, LLP (57) ABSTRACT

Provided is a robot further improved in safety. The robot includes at least one link which is rotatably coupled around an axis, a motor which rotates the link around the axis, a first sensor which detects a rotation state of the motor, and a second sensor which detects a rotation state of the link. The robot also includes a controller which controls the rotation of the link based on information from the first sensor. The controller determines an operation state of at least one of the first sensor and the second sensor, based on first information from the first sensor and second information from the second sensor.

9 Claims, 4 Drawing Sheets

(51) Int. Cl.
  *B25J 9/04* (2006.01)
  *B25J 13/08* (2006.01)
  *G05B 9/02* (2006.01)

(52) U.S. Cl.
  CPC ............... *G05B 9/02* (2013.01); *Y10S 901/02* (2013.01); *Y10S 901/29* (2013.01); *Y10S 901/30* (2013.01); *Y10S 901/49* (2013.01)

(56) References Cited

U.S. PATENT DOCUMENTS

| | | | | |
|---|---|---|---|---|
| 6,438,454 | B1* | 8/2002 | Kuroki | B25J 13/003 700/108 |
| 8,355,817 | B2* | 1/2013 | Nihei | B25J 9/1674 361/23 |
| 8,676,379 | B2* | 3/2014 | Okazaki | B25J 9/1676 700/255 |
| 2004/0246469 | A1* | 12/2004 | Hirose | A61B 1/00048 356/139.03 |
| 2005/0246061 | A1* | 11/2005 | Oaki | B25J 9/1692 700/245 |
| 2006/0071625 | A1* | 4/2006 | Nakata | B25J 9/1633 318/568.12 |
| 2009/0309531 | A1* | 12/2009 | Hamahata | B25J 9/1674 318/565 |
| 2011/0004343 | A1* | 1/2011 | Iida | B25J 9/1638 700/253 |
| 2011/0257785 | A1* | 10/2011 | Nihei | B25J 9/1674 700/254 |
| 2012/0010748 | A1 | 1/2012 | Sasai | |
| 2013/0146574 | A1* | 6/2013 | Birner-Such | B23K 9/28 219/136 |
| 2013/0238127 | A1* | 9/2013 | Ohta | B25J 9/1692 700/254 |
| 2013/0319158 | A1* | 12/2013 | Yamamoto | H02N 2/14 74/490.03 |
| 2014/0060233 | A1* | 3/2014 | Gomi | B25J 9/1638 74/490.05 |
| 2014/0067118 | A1* | 3/2014 | Gomi | B25J 9/1651 700/253 |
| 2014/0067119 | A1* | 3/2014 | Gomi | B25J 9/1651 700/253 |
| 2014/0067120 | A1* | 3/2014 | Gomi | B25J 9/1638 700/254 |
| 2014/0067125 | A1* | 3/2014 | Niu | B25J 9/1638 700/258 |
| 2014/0214204 | A1* | 7/2014 | Toshimitsu | B25J 9/1641 700/253 |
| 2014/0309776 | A1* | 10/2014 | Asada | B25J 9/1651 700/258 |
| 2014/0309777 | A1* | 10/2014 | Niu | B25J 9/06 700/258 |
| 2014/0309778 | A1* | 10/2014 | Asada | B25J 9/06 700/258 |
| 2014/0309779 | A1* | 10/2014 | Niu | B25J 13/088 700/258 |

FOREIGN PATENT DOCUMENTS

| | | |
|---|---|---|
| JP | 64-050909 | 2/1989 |
| JP | 2001-150374 | 6/2001 |
| JP | 2002-144260 | 5/2002 |
| JP | 2007-007804 | 1/2007 |
| JP | 2008-302496 | 12/2008 |
| JP | 2010-064232 | 3/2010 |
| JP | 2011-224727 | 11/2011 |

OTHER PUBLICATIONS

International Search Report for corresponding International Application No. PCT/JP2012/062948, Jun. 12, 2012.
Written Opionion for corresponding International Application No. PCT/JP2012/062948, Jun. 12, 2012.
Chinese Office Action for corresponding CN Application No. 201280073212.1, May 27, 2015.
Japanese Office Action for corresponding JP Application No. 2014-516538, Oct. 27, 2015.

* cited by examiner

ROBOT

CROSS-REFERENCE TO RELATED APPLICATION

This application is a continuation of International Application No. PCT/JP2012/062948, filed on May 21, 2012, the entire contents of which are incorporated herein by reference.

FIELD

Embodiments of the present disclosure relate to a robot.

BACKGROUND

Japanese Patent Application Laid-open No. 2008-302496 discloses a robot controller configured to control operation of the arms to coexist with humans, without damaging humans even if the arms or the like contact the humans.

SUMMARY

Technical Problem

According to an aspect of an embodiment, a robot includes: at least one link which is rotatably coupled around an axis; a motor which rotates the link around the axis; a first sensor which detects a rotation state of the motor; a second sensor which detects a rotation state of the link; and a controller which controls the rotation of the link based on information from the first sensor; wherein the controller determines an operation state of at least one of the first sensor and the second sensor, based on first information from the first sensor and second information from the second sensor.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, the embodiments of a robot disclosed herein will be described in detail with reference to the attached drawings. The present invention is not limited to the embodiments described below.

First Embodiment

Figure 1:
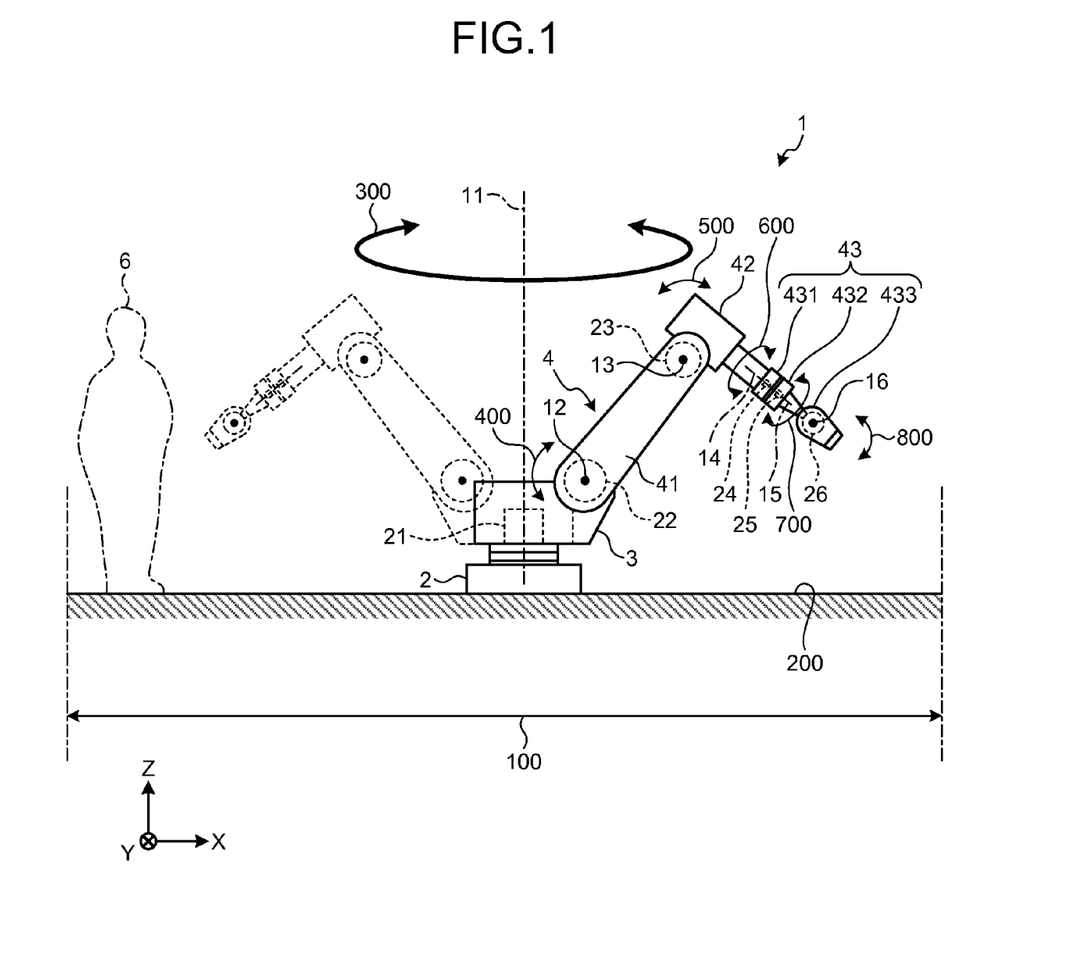
FIG. 1 is an explanatory view illustrating a working area in which a robot according to a first embodiment has been installed.
Figure 2A:
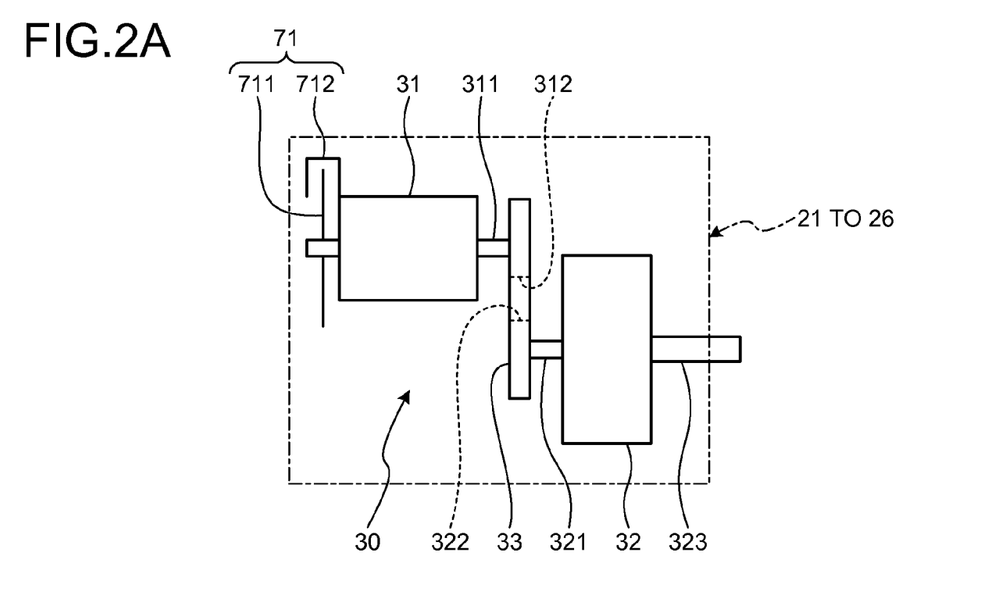
FIG. 2A is a schematic explanatory view of a joint unit and a link included in the robot.
Figure 2B:
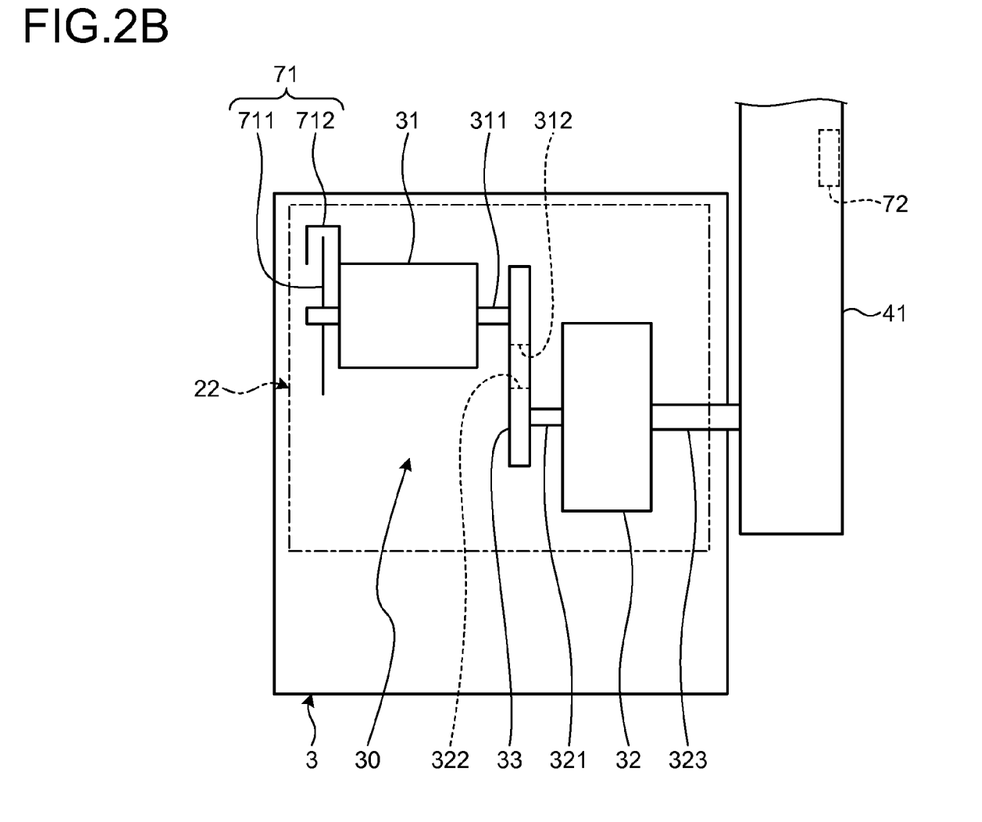
FIG. 2B is a schematic explanatory view illustrating a second joint unit of the robot.
Figure 3:
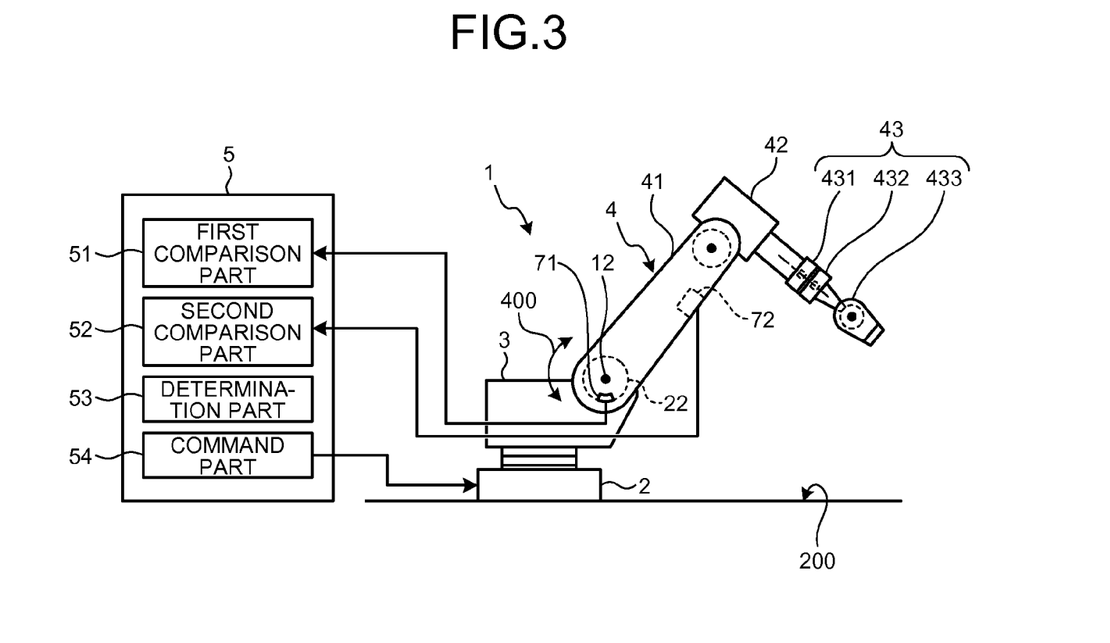
FIG. 3 is an explanatory view illustrating a controller of the robot.

FIG. 1 is an explanatory view illustrating a working area 100 in which a robot 1 according to a first embodiment has been installed. FIG. 2A is a schematic explanatory view of a joint unit and a link included in the robot 1. FIG. 2B is a schematic explanatory view illustrating a second joint unit 22 of the robot 1. FIG. 3 is an explanatory view illustrating a controller 5 of the robot 1. Means for determining corresponds to the controller 5.

As illustrated in FIG. 1, the robot 1 according to the present embodiment is installed at a predetermined position of a predetermined working area 100 where a worker 6, etc. can go in and out. An installation position of the robot 1 can be suitably set according to the work. Here, the installation position is set at substantially the center position of the working area 100. The working area 100 is partitioned as a working booth (not illustrated) for example in a manufacturing line of a factory.

As illustrated in FIG. 1, the robot 1 includes a base 2 installed on a floor 200 and an arm unit 4 mounted on this base 2.

The arm unit 4 includes a swiveling unit 40, a first arm 41, a second arm 42, a wrist unit 43, and a flange unit 44. The swiveling unit 40 is pivotally provided to the base 2. The first arm 41 and the second arm 42 are sequentially coupled via shafts respectively. The wrist unit 43 includes a first wrist unit 431, a second wrist unit 432, and a third wrist unit 433. The flange unit 44 rotates. Then, an end effector (not illustrated) suitable to work contents given to the robot 1 is mounted on the flange unit 44.

In this manner, the robot 1 according to the present embodiment is configured by a multi-joint robot in which a body unit 3, the first arm 41, the second arm 42, and the wrist unit 43 are movable parts.

As described below, the robot 1 is the multi-joint robot including a first joint unit 21 to a sixth joint unit 26. The movable parts are rotatable around the axes.

As illustrated in FIG. 2A, each of the first joint unit 21 to the sixth joint unit 26 is configured as an actuator which has a servomotor and a reducer. The first joint unit 21 to the sixth joint unit 26 have a general configuration in common. Each configuration of the first joint units 21 to the sixth joint unit 26 will be described with reference to FIG. 2A.

As illustrated in FIG. 2A, each of the first joint unit 21 to the sixth joint unit 26 includes a transmission mechanism 30 which has a motor 31 and a reducer 32. The motor 31 and the reducer 32 are interlocked and coupled by winding a belt 33 between an output-side pulley 312 provided on an output shaft 311 of the motor 31 and an input-side pulley 322 provided on an input shaft 321 of the reducer 32. Means for rotating corresponds to the motor 31.

FIG. 2B illustrates the second joint unit 22 which is provided on one side portion of the body unit 3 and rotatably couples the first arm 41 being the link. As illustrated in FIG. 2B, the first arm 41 is fixed to an output shaft 323 of the reducer 32, and the first arm 41 is rotated by the driving of the motor 31. That is, the first arm 41 rotates around a second shaft 12, in other words the first arm 41 swings (refer to an arrow 400 in FIG. 1) in the vertical direction, by the transmission mechanism 30.

Incidentally, each motor 31 of the first joint unit 21 to the sixth joint unit 26 is provided with an encoder 71 for detecting a rotation state of the motor. This encoder 71 includes a disk 711 and a detector 712. The disk 711 is mounted on the rear end of the output shaft 311. The detector 712 detects a rotation angle of the output shaft 311 based on the rotation quantity of the disk 711.

Hereinafter, movable parts, which respectively rotate around the shafts via the joint units including the above-described second joint unit 22, will be described briefly based on FIG. 1.

The body unit 3 is rotatably coupled to the substantially cylindrical base 2 via the first joint unit 21. The cylindrical base 2 is fixedly installed on the floor 200. The first joint unit 21 is provided at substantially the center of the base 2 and includes a first shaft 11 which extends in the vertical direction (Z direction).

This first shaft 11 is interlocked and coupled to a first transmission mechanism (refer to the transmission mechanism 30 in FIG. 2A) which includes a first motor and a first reducer. In this manner, the body unit 3 rotates (refer to an arrow 300) around the first shaft 11 in the horizontal direction, relative to the base 2 fixed on the floor 200, by the first transmission mechanism.

The second joint unit 22 is provided on one side portion of the body unit 3 as described above, and the first arm 41 is rotatably coupled via this second joint unit 22. The first arm 41 is coupled at the position eccentric to the first shaft 11. Therefore, this first arm 41 pivots around the first shaft 11 as well as the second arm 42 and the wrist unit 43, which are sequentially coupled to the first arm 41 respectively via the shafts.

The third joint unit 23 is provided at the tip side of the first arm 41 which is the longest of the movable parts, and the substantially L-shaped second arm 42 is coupled via this third joint unit 23.

The third joint unit 23 includes a third shaft 13 which extends in the direction parallel with the second shaft 12, that is, in the same direction as the second shaft 12 which is perpendicular to the first shaft 11. The third shaft 13 is interlocked and coupled to a third transmission mechanism (refer to the transmission mechanism 30 in FIG. 2A) which includes a third motor and a third reducer. In this manner, the second arm 42 rotates around the third shaft 13, that is, the second arm 42 swings (refer to an arrow 500) in the vertical direction, by the third transmission mechanism.

The fourth joint unit 24 is provided at the tip side of the second arm 42, and the first wrist unit 431 is coupled via this fourth joint unit 24.

The wrist unit 43 includes the first wrist unit 431, the second wrist unit 432, and the third wrist unit 433. The first wrist unit 431 is cylindrical and coupled to the fourth joint unit 24. The second wrist unit 432 is coupled to this first wrist unit 431. The third wrist unit 433 is provided with the end effector.

The fourth joint unit 24 which interlocks and couples the first wrist unit 431 includes a fourth shaft 14 which extends in the direction perpendicular to the third shaft 13, that is, in the lateral horizontal direction (X direction) on the figure. This fourth shaft 14 is interlocked and coupled to a fourth transmission mechanism (refer to the transmission mechanism 30 in FIG. 2A) which includes a fourth motor and a fourth reducer. In this manner, the first wrist unit 431, which is interlocked and coupled coaxially with the fourth shaft 14, rotates around the fourth shaft 14, that is, the first wrist unit 431 rotates itself around the fourth shaft 14 (refer to an arrow 600), by the fourth transmission mechanism.

The fifth joint unit 25 is provided at the tip side of the first wrist unit 431, and the second wrist unit 432 is coupled coaxially via this fifth joint unit 25.

The fifth joint unit 25 includes a fifth shaft 15 which extends coaxially with the fourth shaft 14, that is, in the lateral horizontal direction (X direction) on the figure. This fifth shaft 15 is interlocked and coupled to a fifth transmission mechanism (refer to the transmission mechanism 30 in FIG. 2A) which includes a fifth motor and a fifth reducer. Therefore, the second wrist unit 432, which is interlocked and coupled coaxially with the fifth shaft 15, rotates around the fifth shaft 15, that is, the second wrist unit 432 rotates itself around the fifth shaft 15 (refer to an arrow 700), by the fifth transmission mechanism.

The sixth joint unit 26 is provided at the tip side of the second wrist unit 432, and the third wrist unit 433 is coupled via this sixth joint unit 26.

The sixth joint unit 26 includes a sixth shaft 16 which extends in the direction perpendicular to the fifth shaft 15, that is, in the front-back horizontal direction (Y direction) on the figure. This sixth shaft 16 is interlocked and coupled to a sixth transmission mechanism (refer to the transmission mechanism 30 in FIG. 2A) which includes a sixth motor and a sixth reducer. Therefore, the third wrist unit 433 rotates around the sixth shaft 16, that is, the third wrist unit 433 swings (refer to an arrow 800) in the vertical direction, by the sixth transmission mechanism.

As described above, the robot 1 according to the present embodiment includes the body unit 3 and the arm unit 4. The body unit 3 is provided to the base 2 rotatably around the first shaft 11. The base 2 is provided on the floor 200 being a predetermined installation surface. The arm unit 4 is rotatably provided to this body unit 3.

The arm unit 4 includes the first arm 41, the second arm 42, and the wrist unit 43. The first arm 41 is provided to the body unit 3 rotatably around the second shaft 12. The second arm 42 is provided to this first arm 41 rotatably around the third shaft 13. The wrist unit 43 is rotatably provided to the second arm 42.

The wrist unit 43 includes the first wrist unit 431, the second wrist unit 432, and the third wrist unit 433. The first wrist unit 431 is provided to the second arm 42 rotatably around the fourth shaft 14. The second wrist unit 432 is provided to the first wrist unit 431 rotatably around the fifth shaft 15. The third wrist unit 433 is provided to the second wrist unit 432 rotatably around the sixth shaft 16, and a predetermined end effector is mounted at the tip of the third wrist unit 433.

The body unit 3, the first arm 41, the second arm 42, the first wrist unit 431, the second wrist unit 432, and the third wrist unit 433 are the plurality of link bodies rotatably coupled around the axis, and are included in the movable parts of the robot 1. The link is rotated around each shaft (the first shaft 11 to the sixth shaft 16) by the motor provided in each transmission mechanism.

The robot 1 according to the present embodiment includes a first sensor which detects the rotation state of the motor and a second sensor which detects the rotation state of the link. Specifically, as illustrated in FIG. 2, the robot 1 includes the encoder 71 and an acceleration sensor 72. The encoder 71 is the first sensor that detects the rotation state of a second motor 31 provided in the second joint unit 22. The acceleration sensor 72 is the second sensor that detects the rotation state of the first arm 41 being the link. First means for detecting corresponds to the first sensor. Second means for detecting corresponds to the second sensor.

As described above, the encoder 71 being the first sensor includes the disk 711 and the detector 712. The disk 711 is mounted on the rear end of the output shaft 311. The detector 712 detects the rotation angle of the output shaft 311 based on the rotation quantity of the disk 711.

The robot 1 according to the present embodiment performs drive control of the second motor 31 by the controller 5 described below, based on an output value from the encoder 71. That is, in the case of the first arm 41, control of rotation operation of this first arm 41 is performed based on first information from the encoder 71 indicating the rotation angle of the output shaft 311. The encoder 71 is also provided in each of the first joint unit 21, and the third joint unit 23 to the sixth joint unit 26 in the same manner and is used to control each motor.

The acceleration sensor 72 being the second sensor is incorporated midway in the first arm 41, and can detect the change in the position caused by acceleration of the first arm 41. The acceleration sensor 72 can be suitably employed from a semiconductor type, optical type, or mechanical type.

Here, the acceleration sensor 72 has been used as the second sensor, but any one of a speed sensor and a strain sensor can be used instead of the acceleration sensor 72. That is, the second sensor may be a sensor in a different format from the encoder 71 as long as the sensor can detect the actual operation of the link (here, the first arm 41) in which the operation is controlled based on the output value from the encoder 71.

The robot 1 according to the present embodiment includes the controller 5 which controls the operation of the robot 1 as illustrated in FIG. 3. In this controller 5, the program of control command for the robot 1 has been preliminary stored, and the robot 1 is controlled based on the program. The controller 5 is the main part of the robot 1 according to the present embodiment, and the configuration thereof will be described below.

The controller 5 is electrically connected to the robot 1 and includes a storage unit such as a central processing unit (CPU), a read only memory (ROM), a random access memory (RAM), and further a hard disk (not illustrated). In the controller 5, the CPU reads the program stored in the storage unit. Then, according to the program, the controller 5 drives the body unit 3, the first arm 41, the second arm 42, the first wrist unit 431, the second wrist unit 432, and the third wrist unit 433, which are the link bodies. That is, the controller 5 controls the drive of the motor which rotationally drives each link.

In addition, the controller 5 includes a first comparison part 51, a second comparison part 52, a determination part 53, and a command part 54 as illustrated in FIG. 3. This command part 54 outputs a command signal, for example, to the second motor 31 based on the program stored in the storage unit. At this time, the controller 5 performs feedback control based on the first information sent from the encoder 71.

The first comparison part 51 compares the first information received from the encoder 71 with an expected value corresponding to the command signal to the second motor 31. The second comparison part 52 compares second information received from the acceleration sensor 72 with the expected value corresponding to the command signal. The determination part 53 determines an operation state of at least one of the encoder 71 and the acceleration sensor 72 based on each comparison result of the first comparison part 51 and the second comparison part 52.

For example, the controller 5 outputs the command signal to drive the second motor 31 when the first arm 41 is driven. Then, the controller 5 determines the rotation state of the second motor 31 which has been driven in response to such a command signal, from the first information, that is, a received signal from the encoder 71. The first information is based on the rotation angle of the second motor 31 detected by the encoder 71.

In the controller 5 of the present embodiment, this determination is made by using a first comparison table which has been preliminary stored in the first comparison part 51.

That is, when the second motor 31 is rotationally driven in a normal manner based on the command signal, the data, which is detected by the encoder 71 and is supposed to be output to the controller 5, is stored in the first comparison table as the expected value associated with the command signal.

The controller 5 compares the first information with the expected value of the first comparison table. The first information is obtained from the received signal that has been actually output from the encoder 71. Then, the controller 5 stores a flag indicating "normal" in a predetermined storage region when within a predetermined error range. The controller 5 stores a flag indicating "abnormal" in a predetermined storage region when deviated from the predetermined error range.

On the other hand, when the second motor 31 is rotationally driven in a normal manner based on the command signal, the data indicating the operation result of the first arm 41, which is detected by the acceleration sensor 72 and is supposed to be output to the controller 5, is stored in a second comparison table as the expected value associated with the command signal.

The controller 5 compares the second information with the expected value of the second comparison table. The second information is obtained from the received signal that has been actually output from the acceleration sensor 72. Then, the controller 5 stores a flag indicating "normal" in a predetermined storage region when within a predetermined error range. The controller 5 stores a flag indicating "abnormal" in a predetermined storage region when deviated from the predetermined error range.

Then, the controller 5 compares the comparison result obtained via the encoder 71 by using the first comparison table, with the comparison result obtained via the acceleration sensor 72 by using the second comparison table. Then, based on the comparison result, it is possible to determine more accurately whether there is an abnormality at least in the encoder 71.

In this manner, the controller 5 performs operation control of the first arm 41 based on the output of the encoder 71. The controller 5 detects the actual operation result of the first arm 41 in the different format from the encoder 71. The first arm 41 is controlled based on the output value from the encoder 71.

Therefore, when there is an abnormality in the encoder 71 and/or the acceleration sensor 72, such an abnormality can be detected effectively. Therefore, when the abnormality is detected, an appropriate response such as driving stop of the first arm 41 can be taken.

That is, in the controller 5, a driving state of the second motor 31 is monitored dually. As a result, the reliability as a human-coexistence type robot can be further enhanced.

In the above-described robot 1, the acceleration sensor 72 being the second sensor is provided in the first arm 41 which is driven by the second motor 31 including the encoder 71 being the first sensor. However, the acceleration sensor 72 being the second sensor can be provided in each link which is driven by a motor other than the second motor 31.

That is, the acceleration sensors 72 being the second sensors can be provided in the body unit 3, the second arm 42, the first wrist unit 431, the second wrist unit 432, and the third wrist unit 433, respectively.

In this manner, when the acceleration sensors 72 (second sensors) are provided corresponding to the respective link bodies, it is possible to identify the encoder 71 or the acceleration sensor 72 corresponding to the link in which there is a possible abnormality. In this case, the controller 5 associates at least the first comparison part 51 and the second comparison part 52 for each motor.

Second Embodiment

Figure 4:
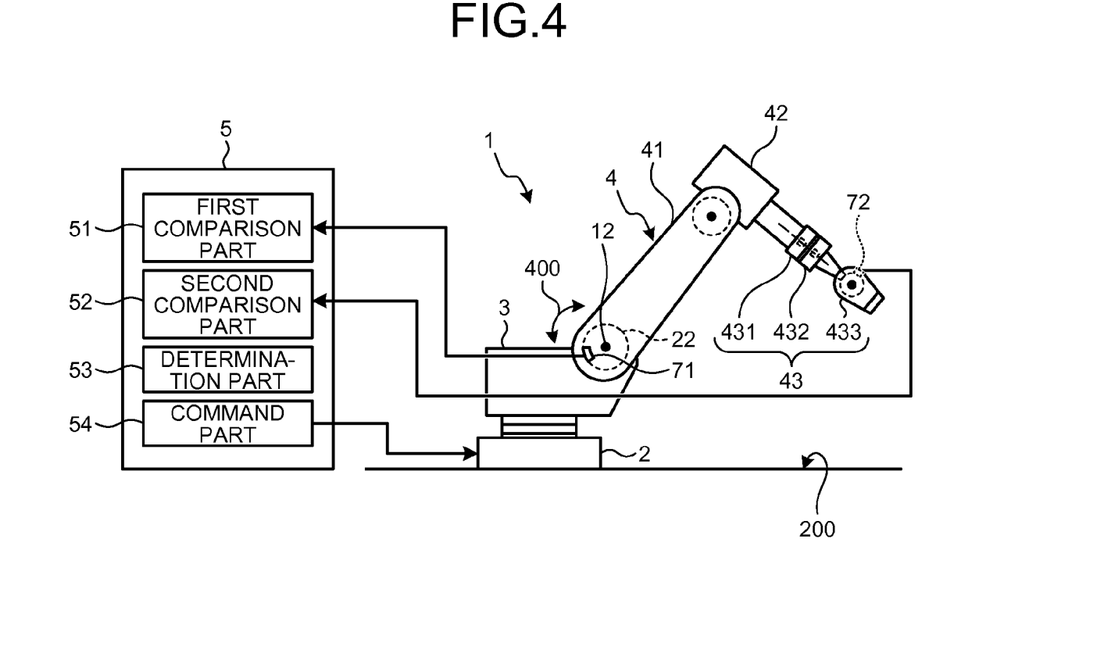
FIG. 4 is an explanatory view illustrating a robot according to a second embodiment.

FIG. 4 is an explanatory view illustrating a robot 1 according to a second embodiment. In the present embodiment, the same reference numerals are used to represent the same components as those of the robot 1 according to the first embodiment described above. The specific description of the components will be omitted.

As illustrated in FIG. 4, in the robot 1 according to the present embodiment, an acceleration sensor 72 being a second sensor is provided at the distal end of a link positioned at the most distal end from a base 2. That is, the acceleration sensor 72 is provided in a third wrist unit 433 which constitutes the distal end of an arm unit 4 which is sequentially coupled via the shaft.

By providing the acceleration sensor 72 in the third wrist unit 433, the movement of the tip of the arm unit 4 which is directly related to a working purpose of the robot 1 can be detected. That is, as the operation result of the robot 1 based on a command signal from a controller 5, the data indicating the normal operation result of the third wrist unit 433 is made an expected value associated with the command signal. Then this expected value is compared with second information obtained from a received signal which is actually received from the acceleration sensor 72.

In accordance with the robot 1 according to the present embodiment, it is possible to realize the detection of abnormality with the minimum number of the second sensor when there is an abnormality in any one of a plurality of encoders 71 by comparing each comparison result of a first comparison unit 51 and a second comparison unit 52.

Third Embodiment

Figure 5:
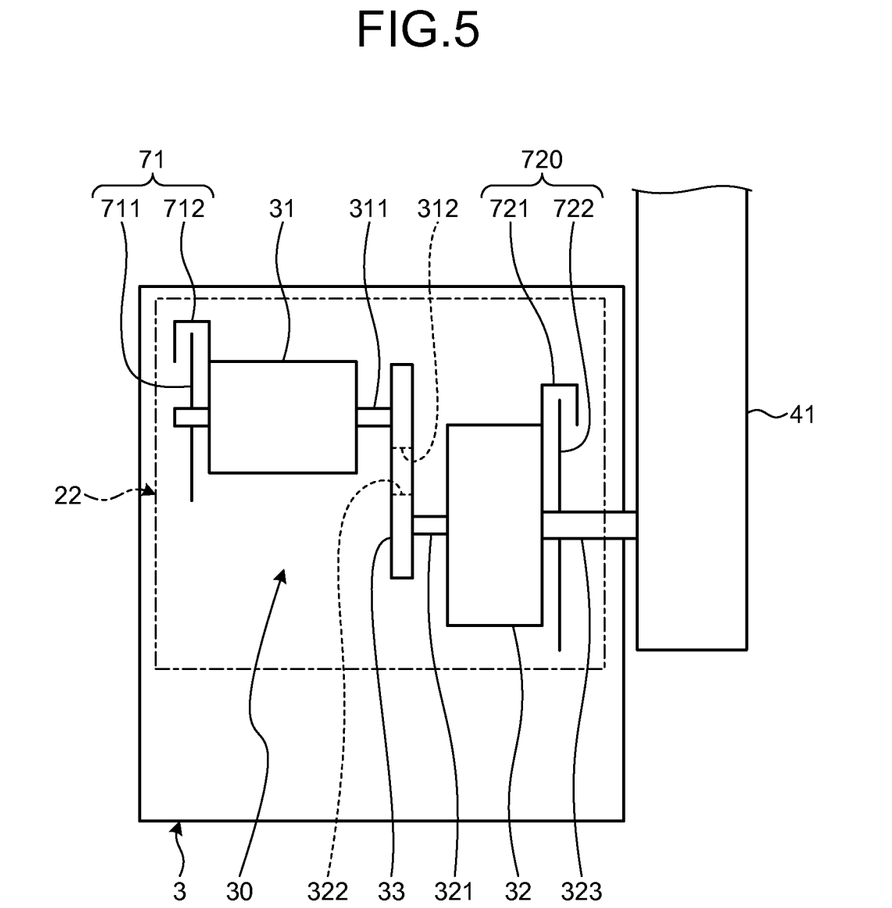
FIG. 5 is an explanatory view of a first sensor and a second sensor included in a robot according to a third embodiment.

FIG. 5 is an explanatory view of a first sensor and a second sensor included in a robot 1 according to a third embodiment. In the present embodiment also, a second joint unit 22 is exemplified, and the same reference numerals are used to represent the same components as those of the first and second embodiments described above. The specific description of the components will be omitted.

In the above-described embodiments, the second sensor has been described as any one of a speed sensor, an acceleration sensor, and a strain sensor. However, here, as with the first sensor, an encoder is used as the second sensor which detects a rotation state of a first arm 41 being a link.

That is, as illustrated in the figure, an encoder 720 on the secondary side as the second sensor is provided, relative to an encoder 71 on the primary side provided in a second motor 31, on the downstream side of a second reducer 32. The encoder 720 on the secondary side includes a disk 721 and a detector 722. The disk 721 is mounted on an output shaft 323 of the second reducer 32. The detector 722 detects a rotation angle of the output shaft 323 based on the rotation quantity of the disk 721.

In this case also, control of the second motor 31 is based on the encoder 71 on the primary side. A controller 5 compares the comparison result obtained via the encoder 71 on the primary side by using a first comparison table, with the comparison result obtained via the encoder 720 on the secondary side by using a second comparison table. Then, according to the result compared, it is possible to determine an operation state of at least one of the encoder 71 on the primary side and the encoder 720 on the secondary side.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents. For example, the present invention may be configured in a case where the link is single.

What is claimed is:

1. A robot comprising:
   at least one link rotatably provided around an axis;
   a motor to rotate the at least one link around the axis;
   a first sensor to detect a rotation state of the motor;
   a second sensor to detect a rotation state of the at least one link; and
   a controller configured to control the rotation state of the at least one link based on first information from the first sensor,
   the controller comprising:
      a first comparator configured to compare the first information received from the first sensor with a first expected value that is determined according to the first information outputted from the first sensor while the motor rotates under normal condition based on a command signal to the motor;
      a second comparator configured to compare second information received from the second sensor with a second expected value that is determined according to the second information outputted from the second sensor while the motor rotates under the normal condition based on the command signal; and
      a determination device configured to determine an abnormality in the first sensor and an abnormality in the second sensor based on each comparison result of the first comparator and the second comparator.

2. The robot according to claim 1,
   wherein the first sensor comprises an encoder attached to the motor, and
   wherein the second sensor comprises any one of a speed sensor, an acceleration sensor, and a strain sensor.

3. The robot according to claim 2,
   wherein the at least one link includes link dodies, and
   wherein the link bodies are sequentially coupled from a base via the respective shafts, and constitute an arm unit.

4. The robot according to claim 3, wherein the second sensor is provided to correspond to each of the at least one link which is driven by each motor.

5. The robot according to claim 3, wherein the second sensor comprises the acceleration sensor and is provided at a distal end of the at least one link positioned at the most distal end from the base.

6. The robot according to claim 1,
   wherein the at least one link includes link dodies, and
   wherein the link bodies are sequentially coupled from a base via the respective shafts, and constitute an arm unit.

7. The robot according to claim 6, wherein the second sensor is provided to correspond to each of the at least one link which is driven by each motor.

8. The robot according to claim 6, wherein the second sensor comprises the acceleration sensor and is provided at a distal end of the at least one link positioned at the most distal end from the base.

9. A robot comprising:
means for rotating a link around an axis;
first means for detecting a rotation state of the means for rotating;
second means for detecting a rotation state of the link;
a first comparison means for comparing first information received from the first means with a first expected value that is determined according to the first information outputted from the first means while the means for rotating rotates under normal condition based on a command signal to the means for rotating;
a second comparison means for comparing, second information received from the second means with a second expected value that is determined according to the second information outputted from the second means while the means for rotating under the normal condition based on the command signal; and
means for determining an abnormality in the first means and an abnormality in the second means based on each comparison result of the first comparison means and the second comparison means.

* * * * *